(12) United States Patent
Brinkley et al.

(10) Patent No.: US 8,678,129 B2
(45) Date of Patent: Mar. 25, 2014

(54) METHOD FOR SELECTIVELY CHARGING AND DISCHARGING A STEERING ACCUMULATOR

(71) Applicant: CNH America LLC, New Holland, PA (US)

(72) Inventors: Jerry L. Brinkley, Woodridge, IL (US); Adam R. Rusciolelli, Chicago, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 14/028,675

(22) Filed: Sep. 17, 2013

(65) Prior Publication Data

US 2014/0013733 A1    Jan. 16, 2014

Related U.S. Application Data

(62) Division of application No. 13/205,789, filed on Aug. 9, 2011, now Pat. No. 8,561,751.

(51) Int. Cl.
*B62D 5/06* (2006.01)

(52) U.S. Cl.
USPC ............ 180/421; 180/422; 180/441; 180/442

(58) Field of Classification Search
USPC ................. 180/406, 417, 421, 422, 441, 442
See application file for complete search history.

(56) References Cited

U.S. PATENT DOCUMENTS

| | | |
|---|---|---|
| 3,458,998 A | 8/1969 | Bishop |
| 3,463,261 A | 8/1969 | Runkie et al. |
| 3,719,249 A | 3/1973 | Becker et al. |
| 3,882,952 A | 5/1975 | Crabb |
| 4,043,124 A | 8/1977 | Weisgerber |
| 4,076,096 A | 2/1978 | Hushower et al. |
| 4,217,968 A | 8/1980 | Dezelan |
| 4,240,515 A | 12/1980 | Kirkwood |
| 4,303,089 A | 12/1981 | Gage et al. |
| 4,326,558 A | 4/1982 | Gage |
| 4,422,290 A | 12/1983 | Huffman |
| 4,476,677 A | 10/1984 | Hanshaw |
| 4,574,904 A | 3/1986 | Goode |
| 4,625,751 A | 12/1986 | Gage |
| 6,145,309 A | 11/2000 | Spillner |
| 6,250,416 B1 * | 6/2001 | Pluschke et al. ............... 180/404 |
| 6,948,584 B2 | 9/2005 | Budaker et al. |
| 7,597,168 B2 | 10/2009 | Anderson et al. |
| 7,743,610 B2 * | 6/2010 | Miller ............................. 60/418 |
| 7,891,459 B2 | 2/2011 | Lech et al. |

* cited by examiner

*Primary Examiner* — Kevin Hurley
*Assistant Examiner* — Marc A Scharich
(74) *Attorney, Agent, or Firm* — Sue C. Watson

(57) ABSTRACT

A method for selectively charging and discharging a steering accumulator are provided. One vehicle steering system includes a hydraulic pump configured provide a source of pressurized hydraulic fluid for use in steering the vehicle. The steering system also includes an accumulator configured to hold pressurized hydraulic fluid from the pump for use in steering the vehicle in case of need. The steering system includes a charging circuit configured to selectively allow the hydraulic fluid to flow from the hydraulic pump to the accumulator based on a fluid pressure applied by a first pilot and a second pilot. The steering system includes a charging bypass circuit configured to allow the hydraulic fluid to flow to a steering control unit and to bypass the charging circuit. The hydraulic pump supplies fluid to the charging circuit and the bypass circuit.

7 Claims, 3 Drawing Sheets

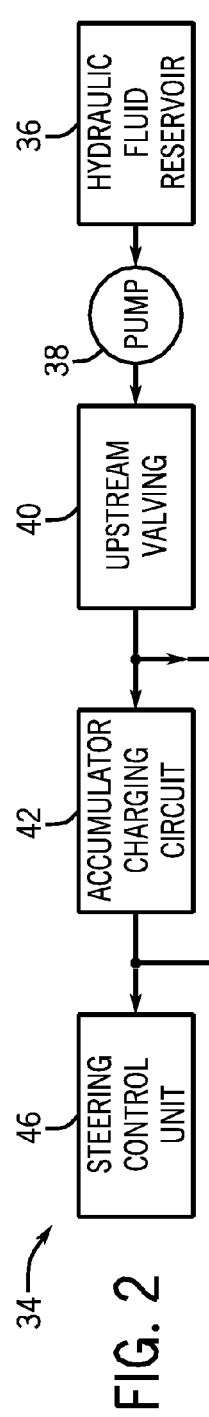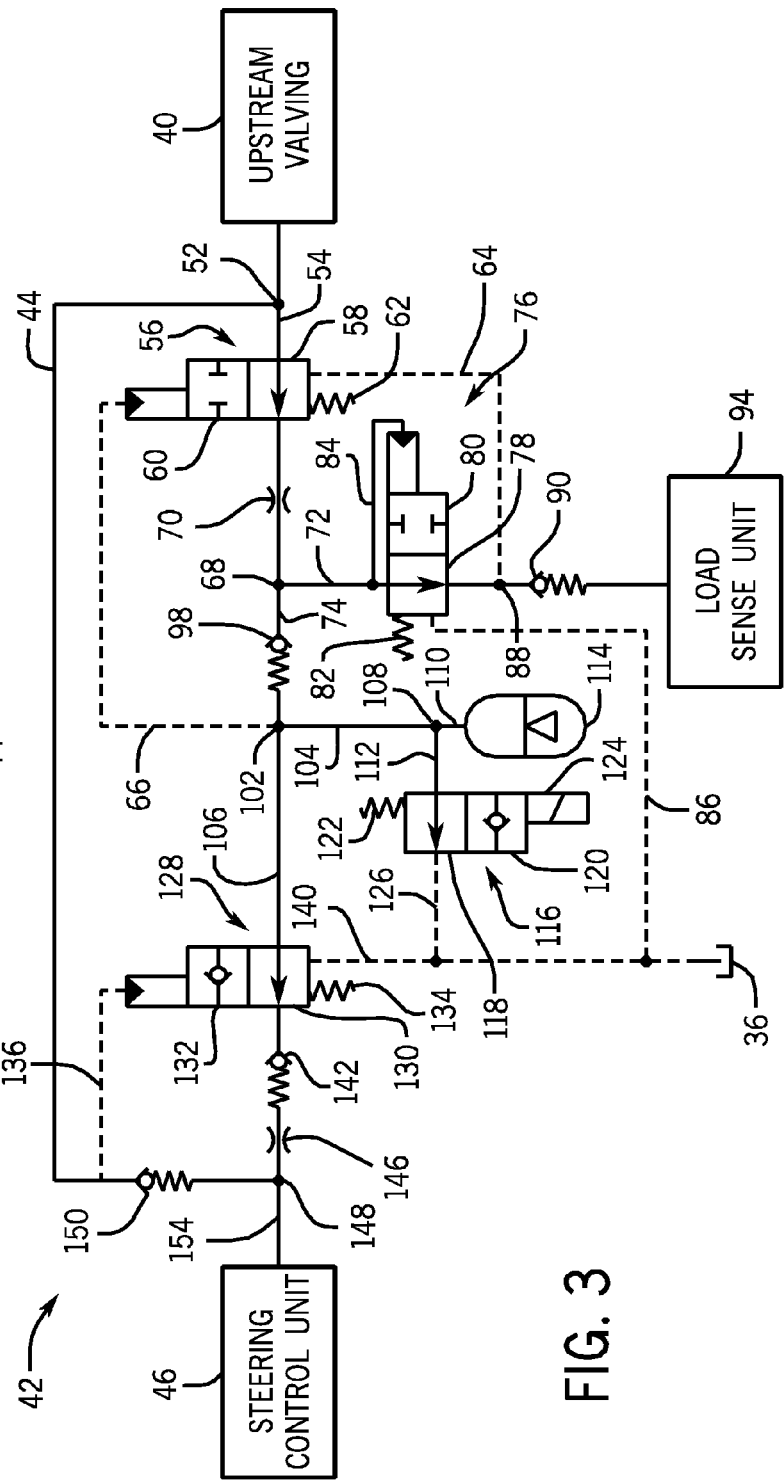

METHOD FOR SELECTIVELY CHARGING AND DISCHARGING A STEERING ACCUMULATOR

CROSS REFERENCE TO RELATED APPLICATIONS

The present application is a continuation of U.S. patent application Ser. No. 13/205,789 filed Aug. 9, 2011, by Jerry Lee Brinkley and Adam Robert Rusciolelli, "System and Method For Selectively Charging And Discharging A Steering Accumulator", which is incorporated by reference herein for all purposes in its entirety.

BACKGROUND

The invention relates generally to hydraulic steering systems and, more particularly, to a system and method for selectively charging and discharging a steering accumulator.

Power steering systems allow an operator to turn a steering wheel of a motorized vehicle with greater torque than in systems without power steering. Thus, a vehicle equipped with power steering is easier to maneuver than the same type of vehicle without power steering. In certain vehicles, such as certain agricultural vehicles, off-road vehicles, work vehicles, and the like, turning a steering wheel without power steering may be very difficult. Many vehicle power steering systems are hydraulically based, particularly in such large vehicle applications. In hydraulically based power steering systems, a hydraulic pump generally pumps hydraulic fluid to be used by the power steering system. As may be appreciated, certain faults may occur in power steering systems that cause the systems to not function properly. For example, the hydraulic pump may stop functioning, a control unit may not work properly, an engine failure may occur, or hoses carrying hydraulic fluid may leak.

To overcome certain power steering problems, power steering systems may use an accumulator to store a supply of pressurized hydraulic fluid that can be used as a backup if pressure from the main hydraulic fluid supply drops too low. In such systems, the accumulator may be charged while the hydraulic system is functioning properly. If a problem is detected, the power steering system switches from using the main hydraulic fluid supply to the backup hydraulic fluid supply from the accumulator. This allows a vehicle operator to maneuver the vehicle for a short period of time, such as for moving the vehicle from a location on a road to a roadside or parked location. However, known power steering systems implement accumulator charging and/or discharging in an inefficient manner. Accordingly, there exists a need for steering accumulator charging systems that efficiently charge and/or discharge the steering accumulator.

SUMMARY

In one embodiment, a vehicle steering system includes a hydraulic pump configured to provide a source of pressurized hydraulic fluid for use in steering the vehicle. The steering system also includes an accumulator configured to hold pressurized hydraulic fluid from the pump for use in steering the vehicle in case of need. The steering system includes a charging circuit having a charging valve and a hysteresis valve. The charging valve has a first pilot and a second pilot. The charging valve is configured to selectively allow the hydraulic fluid to flow from the hydraulic pump to the accumulator based on a first fluid pressure applied by the first pilot and a second fluid pressure applied by the second pilot. The hysteresis valve is configured to selectively allow the hydraulic fluid to flow from the charging valve to the first pilot of the charging valve. The steering system includes a charging bypass circuit configured to allow the hydraulic fluid to flow from the hydraulic pump to a steering control unit and to bypass the accumulator charging circuit. The hydraulic pump supplies fluid to the accumulator charging circuit and the charging bypass circuit.

In another embodiment, a method for charging an accumulator of a vehicle steering system is provided. The method includes opening a charging valve to allow hydraulic fluid to flow from a hydraulic pump to an accumulator. The method also includes closing a hysteresis valve when the hydraulic fluid in the accumulator reaches a first fluid pressure. Before the hysteresis valve is closed, hydraulic fluid flowing through the hysteresis valve applies pressure via a first pilot of the charging valve. The method includes closing the charging valve after the hysteresis valve is closed. The charging valve is closed when the combined pressure applied by the first pilot and a spring drops below pressure applied by a second pilot of the charging valve. The method also includes opening the charging valve to allow hydraulic fluid to flow from the hydraulic pump to the accumulator when the pressure applied by the second pilot of the charging valve decreases below the combined pressure applied by the first pilot and the spring.

In another embodiment, a vehicle steering system includes an accumulator charging valve configured to allow hydraulic fluid to flow to an accumulator when the combined force applied to the charging valve by a spring and a first pilot is greater than the force applied to the charging valve by a second pilot.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a block diagram of an embodiment of a vehicle steering system with an accumulator charging circuit in accordance with the disclosure;

FIG. 3 is a schematic diagram of an embodiment of an accumulator charging circuit generally conforming to the embodiment of FIG. 2.

DETAILED DESCRIPTION OF THE PREFERRED EMBODIMENT(S)

Figure 1:
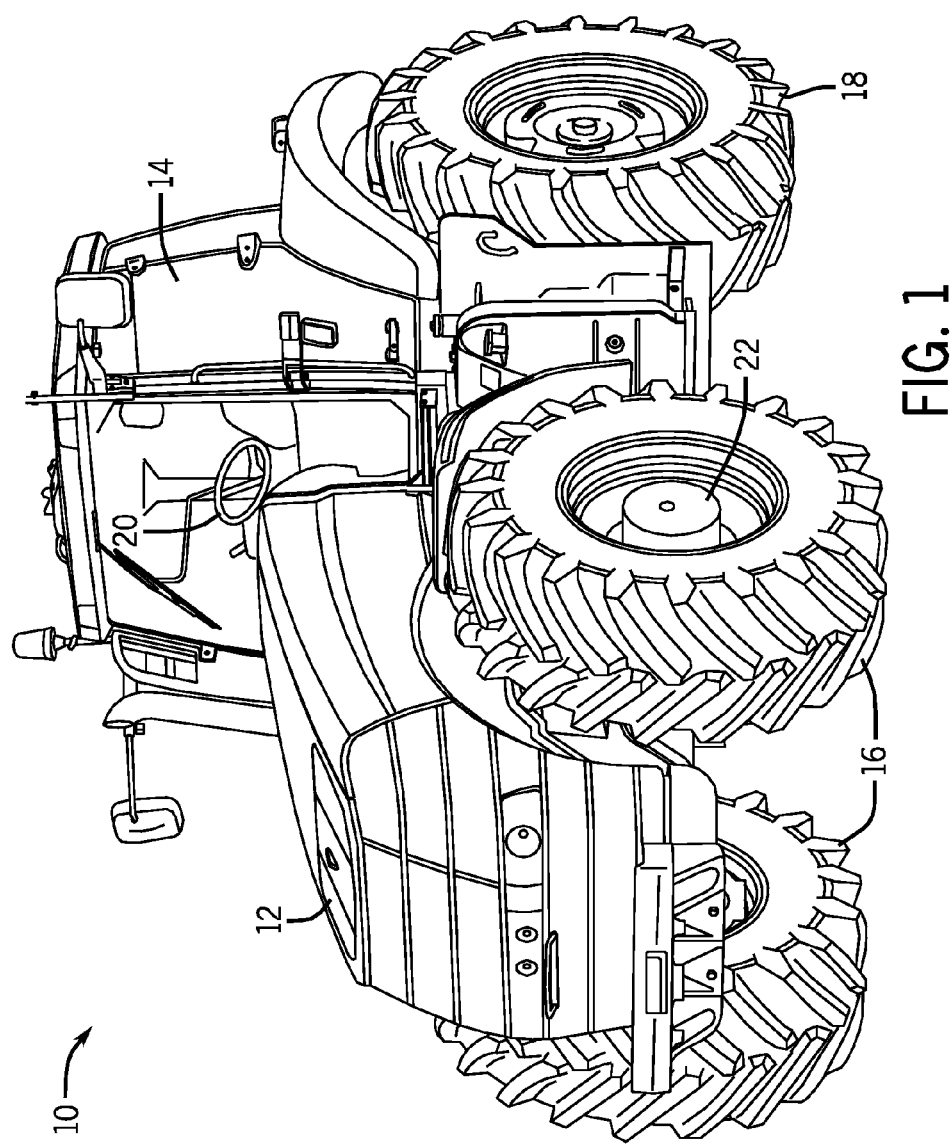
FIG. 1 is a perspective view of an embodiment of an agricultural vehicle that may employ a vehicle steering system with an accumulator charging circuit in accordance with the present disclosure.

FIG. 1 illustrates an exemplary agricultural vehicle 10 that may employ a vehicle steering system with an accumulator charging circuit. In certain embodiments, the agricultural vehicle 10 may be any type of tractor, off-road vehicle, work vehicle, or any other suitable vehicle that utilizes a power steering system with a need for a hydraulic backup. The vehicle 10 illustrated has a body 12 that will typically house an engine, transmission, and power train (not separately shown). Further, the agricultural vehicle 10 has a cabin 14 where an operator may sit or stand to operate the vehicle 10. The vehicle 10 has two front wheels 16 and two rear wheels 18 (only one is shown) that rotate to move the vehicle 10. As may be appreciated, the vehicle 10 is maneuvered using a steering wheel 20 that causes the wheels 16 to turn. The wheels 16 are coupled together by an axle 22 so that both wheels 16 may be rotated together. The agricultural vehicle 10 may include a vehicle steering system with an accumulator charging circuit. The vehicle steering system may charge the accumulator during normal operation so the accumulator may be used as a backup source of hydraulic fluid if the standard vehicle steering system does not function properly. It should be noted that, depending upon the vehicle design, the steering system may control the movement of directional wheels, or other structures may be controlled for steering, such as articulation joints between portions of the vehicle frame.

FIG. 2 is a block diagram of a vehicle steering system 34 with an accumulator charging circuit. The system 34 includes a hydraulic fluid reservoir 36, or, in other embodiments, some other type of hydraulic fluid source. Hydraulic fluid is pumped from the reservoir 36 through the system 34 by the hydraulic pump 38. The hydraulic fluid flows from the pump 38 to upstream valving 40. For example, the upstream valving 40 may include various valves, such as relief valves, check valves, directional control valves, pressure regulating valves, and so forth. As illustrated, the hydraulic fluid flows from the upstream valving 40 to an accumulator charging circuit 42 where an accumulator is charged for use in the steering system 34. The hydraulic fluid may bypass the accumulator charging circuit 42 by flowing through the bypass circuit 44. When the hydraulic fluid flows through the bypass circuit 44, the fluid flows to a steering control unit 46 without passing through the accumulator charging circuit 42.

In contrast, when the hydraulic fluid flows to the accumulator charging circuit 42, it does not flow to the steering control unit 46 until a loss of hydraulic fluid pressure is detected in the bypass circuit 44. The steering control unit 46 uses the hydraulic fluid to provide power steering to the vehicle 10. It should be noted that the system 34 illustrated uses only one pump 38 to supply hydraulic fluid to both the accumulator charging circuit 42 and to the bypass circuit 44. Therefore, the system 34 is designed to function in an efficient manner by utilizing a single pump 38 for multiple functions (e.g., the accumulator charging circuit 42 and the steering control unit 46). Further, the bypass circuit 44 allows a majority, or during extended periods, all of the hydraulic fluid to bypass the accumulator charging circuit 42. As such, the components of the accumulator charging circuit 42 are exposed to lower wear and tear than systems that have the hydraulic fluid for the steering control unit 46 generally flow through the accumulator charging circuit 42.

FIG. 3 is a schematic diagram illustrating an embodiment of the accumulator charging circuit 42. As previously discussed, hydraulic fluid flows from the upstream valving 40 toward the accumulator charging circuit 42. In particular, the hydraulic fluid flows to a connection 52 that connects a flow path 54 to the bypass circuit 44. The flow path 54 enables hydraulic fluid to flow from the connection 52 to a charging valve 56 of the accumulator charging circuit 42. The charging valve 56 has two positions, an open position 58 that allows hydraulic fluid to flow through the charging valve 56, and a closed position 60 that inhibits hydraulic fluid from flowing through the charging valve 56. As may be appreciated, the charging valve 56 alternates between the open and closed positions 58 and 60 during operation of the accumulator charging circuit 42.

The charging valve 56 is moved to the open position 58 by pressure exerted on the valve 56 by a biasing spring 62 and pressure in a first pilot 64. Conversely, the charging valve 56 is moved to the closed position 60 by pressure exerted on the valve 56 by pressure in a second pilot 66. Initially, before the hydraulic fluid flows to the accumulator charging circuit 42, the charging valve 56 will be in the open position 58 based on the pressure exerted by the spring 62. The charging valve 56 then moves between the open and closed positions 58 and 60 as the first and second pilots 64 and 66 apply and remove pressure. For example, when the combined pressures (or forces) exerted by the spring 62 and the first pilot 64 are greater than the pressure (or force) exerted by the second pilot 66, the charging valve 56 will be in the open position 58. In contrast, when the combined pressures (or forces) exerted by the spring 62 and the first pilot 64 are less than the pressure exerted by the second pilot 66, the charging valve 56 will be in the closed position 60.

When the charging valve 56 is in the open position 58, the hydraulic fluid flows through the charging valve 56 toward a connection 68. An orifice 70 (or restrictor) slows the flow rate of the hydraulic fluid from the charging valve 56 to the connection 68. Therefore, a greater amount of the hydraulic fluid will flow through the bypass circuit 44 than will flow through the charging valve 56. From the connection 68, the hydraulic fluid flows to flow paths 72 and 74. Specifically, the hydraulic fluid flows through the flow path 72 to a hysteresis valve 76. The hysteresis valve 76 also has two positions, an open position 78 that allows hydraulic fluid to flow through the hysteresis valve 76, and a closed position 80 that inhibits hydraulic fluid from flowing through the hysteresis valve 76. The hysteresis valve 76 alternates between the open and closed positions 78 and 80 during operation of the accumulator charging circuit 42.

The hysteresis valve 76 is moved to the open position 78 by pressure (or force) exerted on the valve 76 by a spring 82. Conversely, the hysteresis valve 76 is moved to the closed position 80 by pressure (or force) exerted on the valve 76 by a third pilot 84. Initially, before the hydraulic fluid flows to the accumulator charging circuit 42, the hysteresis valve 76 will be in the open position 78 based on the pressure (or force) exerted by the spring 82. The hysteresis valve 76 then moves between the open and closed positions 78 and 80 as the third pilot 84 applies and removes pressure. For example, when the pressure exerted by the spring 82 is greater than the pressure exerted by the third pilot 84, the hysteresis valve 76 will be in the open position 78. In contrast, when the pressure exerted by the spring 82 is less than the pressure exerted by the third pilot 84, the hysteresis valve 76 will be in the closed position 80. The hysteresis valve 76 includes a drain port 86 that allows hydraulic fluid to flow from the hysteresis valve 76 to the reservoir 36 when leakage in the valve 76 occurs. The drain port 86 allows the hydraulic fluid to drain so that additional pressure will not be applied to the valve 76 in conjunction with the spring 82.

When the hysteresis valve 76 is in the open position 78, the hydraulic fluid flows through the hysteresis valve 76 toward a connection 88. From connection 88, the hydraulic fluid flows to the first pilot 64 to apply fluid pressure on the charging valve 56. The hydraulic fluid also flows through a spring loaded ball check valve 90. The check valve 90 allows the hydraulic fluid to flow in one direction from the hysteresis valve 76 to a load sense unit 94 (i.e., the hydraulic fluid is inhibited from flowing from the load sense unit 94 to the hysteresis valve 76). The load sense unit 94 monitors the load on the pump 38 to help maintain a high pressure in the accumulator charging circuit 42.

Returning to the connection 68, the hydraulic fluid also flows through the flow path 74 to another spring loaded ball check valve 98. Like the check valve 90, the check valve 98 allows the hydraulic fluid to flow in one direction. Continuing on, the hydraulic fluid flows from the check valve 98 to a connection 102. From the connection 102, the hydraulic fluid flows to flow paths 104 and 106 and to the second pilot 66. In particular, the hydraulic fluid flows through the flow path 104 to a connection 108. The connection 108 splits the hydraulic fluid flow into two more flow paths 110 and 112.

Specifically, the hydraulic fluid that flows through the flow path 110 fills an accumulator 114. Although only one accumulator 114 is illustrated, certain embodiments may include more than one accumulator 114, such as embodiments that use a series of accumulators. Further, the size of the accumulator may vary between embodiments. The hydraulic fluid flows to the accumulator 114 until the accumulator 114 is charged. In some embodiments, the accumulator 114 is charged when the accumulator 114 is full of hydraulic fluid and when the hydraulic fluid pressure in the accumulator 114 passes a minimum pressure.

The hydraulic fluid also flows from the connection 108 through the flow path 112 to a discharge valve 116. The discharge valve 116 has two positions, an open position 118 that allows hydraulic fluid to flow through the discharge valve 116, and a closed position 120. In the closed position, a check valve symbolizes that the valve 116 is in a low leak shut position. The discharge valve 116 alternates between the open and closed positions 118 and 120 during operation of the accumulator charging circuit 42.

The discharge valve 116 is moved to the open position 118 by pressure exerted on the valve 116 by a spring 122. Conversely, the discharge valve 116 is moved to the closed position 120 by pressure exerted on the valve 116 by a solenoid 124. Initially, before the hydraulic fluid flows to the accumulator charging circuit 42, the discharge valve 116 will be in the open position 118 based on the pressure exerted by the spring 122. The discharge valve 116 then moves between the open and closed positions 118 and 120 as the solenoid 124 applies and removes pressure. For example, when the pressure exerted by the spring 122 is greater than the pressure exerted by the solenoid 124, the discharge valve 116 will be in the open position 118. In contrast, when the pressure exerted by the spring 122 is less than the pressure exerted by the solenoid 124, the discharge valve 116 will be in the closed position 120. When the discharge valve 116 is in the open position 118, the hydraulic fluid may flow through the discharge valve 116 to flow path 126 and then be directed toward the reservoir 36. As may be appreciated, the solenoid 124 may be energized using various methods. For example, the solenoid 124 may be electrically connected so it is energized when the vehicle 10 key is turned on, or the solenoid 124 may be energized when the steering control unit 46 is initialized.

Returning to the connection 102, the hydraulic fluid also flows through the flow path 106 to a backup steering valve 128. The backup steering valve 128 also has two positions, an open position 130 that allows hydraulic fluid to flow through the backup steering valve 128, and a closed position 132. In the closed position, a check valve symbolizes that the valve 128 is in a low leak shut position. The backup steering valve 128 alternates between the open and closed positions 130 and 132 during operation of the accumulator charging circuit 42.

The backup steering valve 128 is moved to the open position 130 by pressure exerted on the valve 128 by a spring 134. Conversely, the backup steering valve 128 is moved to the closed position 132 by pressure exerted on the valve 116 by a fourth pilot 136 (i.e., steering hydraulic fluid pressure). Initially, before the hydraulic fluid flows to the bypass circuit 44, the backup steering valve 128 is in the open position 130 based on the pressure exerted by the spring 134. The backup steering valve 128 then moves between the open and closed positions 130 and 132 as the fourth pilot 136 applies and removes pressure. For example, when the pressure exerted by the spring 134 is greater than the pressure exerted by the fourth pilot 136, the backup steering valve 128 will be in the open position 130. In contrast, when the pressure exerted by the spring 134 is less than the pressure exerted by the fourth pilot 136, the backup steering valve 128 will be in the closed position 132. The backup steering valve 128 includes a drain port 140 that allows hydraulic fluid to flow from the backup steering valve 128 to the reservoir 36 when leakage in the valve 128 occurs. The drain port 140 allows the hydraulic fluid to drain so that additional pressure will not be applied to the valve 128 in conjunction with the spring 134.

When the backup steering valve 128 is in the open position 130, the hydraulic fluid flows through the backup steering valve 128 to another spring loaded ball check valve 142. Like the check valve 98, the check valve 142 allows the hydraulic fluid to flow in one direction. The hydraulic fluid flows from the check valve 142, through an orifice 146 (or restrictor) to a connection 148. The orifice 146 slows the flow rate of the hydraulic fluid from the backup steering valve 128 to the connection 148. In certain embodiments, the restricted flow caused by the orifice 146 allows a smaller accumulator 114 to be used in the accumulator charging circuit 42 than would otherwise be possible. In other embodiments, the orifice 146 limits the flow of hydraulic fluid for the steering system 34 to meet certain regulations or specifications.

Returning to connection 52, the hydraulic fluid flows from the connection 52, through another spring loaded ball check valve 150 to the connection 148. Like the check valve 142, the check valve 150 allows the hydraulic fluid to flow in one direction. At the connection 148, the fluid flow paths from the accumulator charging circuit 42 and the bypass circuit 44 are combined so there is one flow path 154 from the connection 148 to the steering control unit 46. The hydraulic fluid flows through the flow path 154 to the steering control unit 46.

The accumulator charging circuit 42 may operate according to the following description. An operator may turn on the agricultural vehicle 10. When the vehicle 10 is turned on, the solenoid 124 may be energized and cause the discharge valve 116 to move to the closed position 120 as the energized solenoid 124 applies a greater pressure than the spring 122. With the discharge valve 116 in the closed position 120, hydraulic fluid is inhibited from exiting the accumulator 114 through the flow path 126. With the vehicle 10 on, the hydraulic pump 38 may pump hydraulic fluid through the upstream valving 40 to the connection 52. In parallel, the hydraulic fluid flows through the bypass circuit 44 and the accumulator charging circuit 42. The hydraulic fluid flows through the bypass circuit 44 to the steering control unit 46 to operate the steering system 34. The hydraulic fluid also flows through the fourth pilot 136 to begin applying fluid pressure on the backup steering valve 128. When the pressure applied by the fourth pilot 136 (i.e., steering hydraulic fluid pressure) is greater than the pressure applied by the spring 134, the backup steering valve 128 will move to the closed position 132.

The hydraulic fluid that flows into the accumulator charging circuit 42 flows concurrently to the accumulator 114 and to the hysteresis valve 76. Further, until the backup steering valve 128 closes, some hydraulic fluid may flow through the backup steering valve 128 to the steering control unit 46. However, the hydraulic fluid will tend to flow through less restrictive flow paths than the path that includes the orifice 146 (e.g., the hydraulic fluid will tend to flow to the accumulator 114 or to the load sense unit 94). As hydraulic fluid flows through the accumulator charging circuit 42, the accumulator 114 will fill up and begin to be charged with pressurized hydraulic fluid. Further, the first, second, and third pilots 64, 66, and 84 will apply pressure to the charging and hysteresis valves 56 and 76. As the pressure applied by the second pilot 66 increases, the pressure applied by the first pilot 64 will also increase. Therefore, the charging valve 56 will continue to remain open as long as the pressure applied by the spring 62 and the first pilot 64 are greater than the pressure applied by the second pilot 66. In other words, during charging, the forces applied by the first pilot 64 and the second pilot 66 generally remain equal and cancel each other out with a net force of zero. Therefore, the spring 62 holds the valve 56 open as long as the forces applied by the first pilot 64 and the second pilot 66 are substantially the same.

As the pressure of the hydraulic fluid in the accumulator charging circuit 42 increases, the pressure applied by the third pilot 84 to the hysteresis valve 76 will eventually become greater than the pressure applied by the spring 82 to the hysteresis valve 76. When this occurs, the hysteresis valve 76 will transition to the closed position 80. In the closed position, the flow of hydraulic fluid to the first pilot 64 will stop and the pressure applied to the charging valve 56 by the first pilot 64 will begin to decrease as the first pilot 64 drains to the load sense unit 94.

When the combined pressure applied by the first pilot 64 and the spring 62 decreases below the pressure applied by the second pilot 66, the charging valve 56 will transition to the closed position 60. At this point, the accumulator 114 will be fully charged. However, when the charging valve 56 is closed, the pressure applied by the third pilot 84 to the hysteresis valve 76 will begin to decrease as hydraulic fluid exits the relief port 88. Further, the charged pressure of the accumulator 114 will slowly decrease. After the pressure applied by the third pilot 84 to the hysteresis valve 76 decreases below the pressure applied by the spring 82 (e.g., by hydraulic fluid from the third pilot 84 "leaking" through the hysteresis valve 76 into the reservoir 36), the hysteresis valve 76 will transition to the open position 78.

With the hysteresis valve 76 in the open position 78 (e.g., the hydraulic valve is reset), the hydraulic fluid will be able to flow through the first pilot 64. However, because the charging valve 56 is in the closed position 60, there will be minimal hydraulic fluid flowing to the first pilot 64. After the pressure applied by the first pilot 64 and the spring 62 increases above the pressure applied by the second pilot 66, the charging valve 56 will transition to the open position 58 to again charge the accumulator 114. It should be noted that the pressure applied by the first pilot 64 and the spring 62 to the charging valve 56 will primarily be spring 62 pressure when the charging valve 56 is in the closed position 60. Therefore, the charging valve 56 will remain in the closed position 60 until the pressure applied by the second pilot 66 is less than the pressure applied by the spring 62. The pressure applied by the second pilot 66 decreases as the pressure in the accumulator 114 decreases. The process of closing and opening the charging valve 56 and the hysteresis valve 76 as previously described continue to repeat during normal operation of the accumulator charging circuit 42. Thus, the charging circuit 42 keeps the charge on the accumulator 114 between an upper limit (e.g., maximum or cut-out pressure) and a lower limit (e.g., minimum or cut-in pressure). For example, the maximum pressure occurs when the charging valve 56 transitions to the closed position 60 and the minimum pressure occurs when the charging valve 56 transitions to the open position 58. Therefore, the charging of the accumulator 114 is accomplished using a hysteresis based input. In other words, the operation of the charging valve 56 is hysteresis based.

When the accumulator 114 is charged, the accumulator 114 may be used to provide the hydraulic fluid to the steering control unit 46 for a limited time. During operation, if the pressure applied by the fourth pilot 136 (i.e., steering hydraulic fluid pressure) decreases below the pressure applied by the spring 134, the backup steering valve 128 will transition from the closed position 132 to the open position 130. This will allow the hydraulic fluid to flow from the accumulator 114, through the check valve 142, through the orifice 146, and to the steering control unit 46. Further, if such a condition occurs, a sensor may provide feedback to the operator that there is a loss of power steering pressure. As may be appreciated, the operator may also notice the loss of power steering pressure based on the difficulty of turning the steering wheel 20.

In conditions where the accumulator 114 is not used to provide the hydraulic fluid to the steering control unit 46, the accumulator 114 is fully charged when operation of the vehicle 10 is complete. In such conditions, the vehicle 10 operator will shut off the key and the discharge valve 116 will transition to the open position 118. The accumulator 114 will then drain the hydraulic fluid it holds into the reservoir 36.

The valves 56, 76, and 128, as illustrated, are all hydro-mechanical valves. In other embodiments, some or all of the valves 56, 76, and 128 may be electro-hydraulic valves. In addition, the check valves 90, 98, 142, and 150 are all spring loaded ball check valves. In certain embodiments, the check valves 90, 98, 142, and 150 may be any type of unidirectional valve. Further, it may be appreciated that the steering system 34 may use the output from the accumulator charging circuit 42 in conjunction with a dual gerotor steering system.

Figure 4:
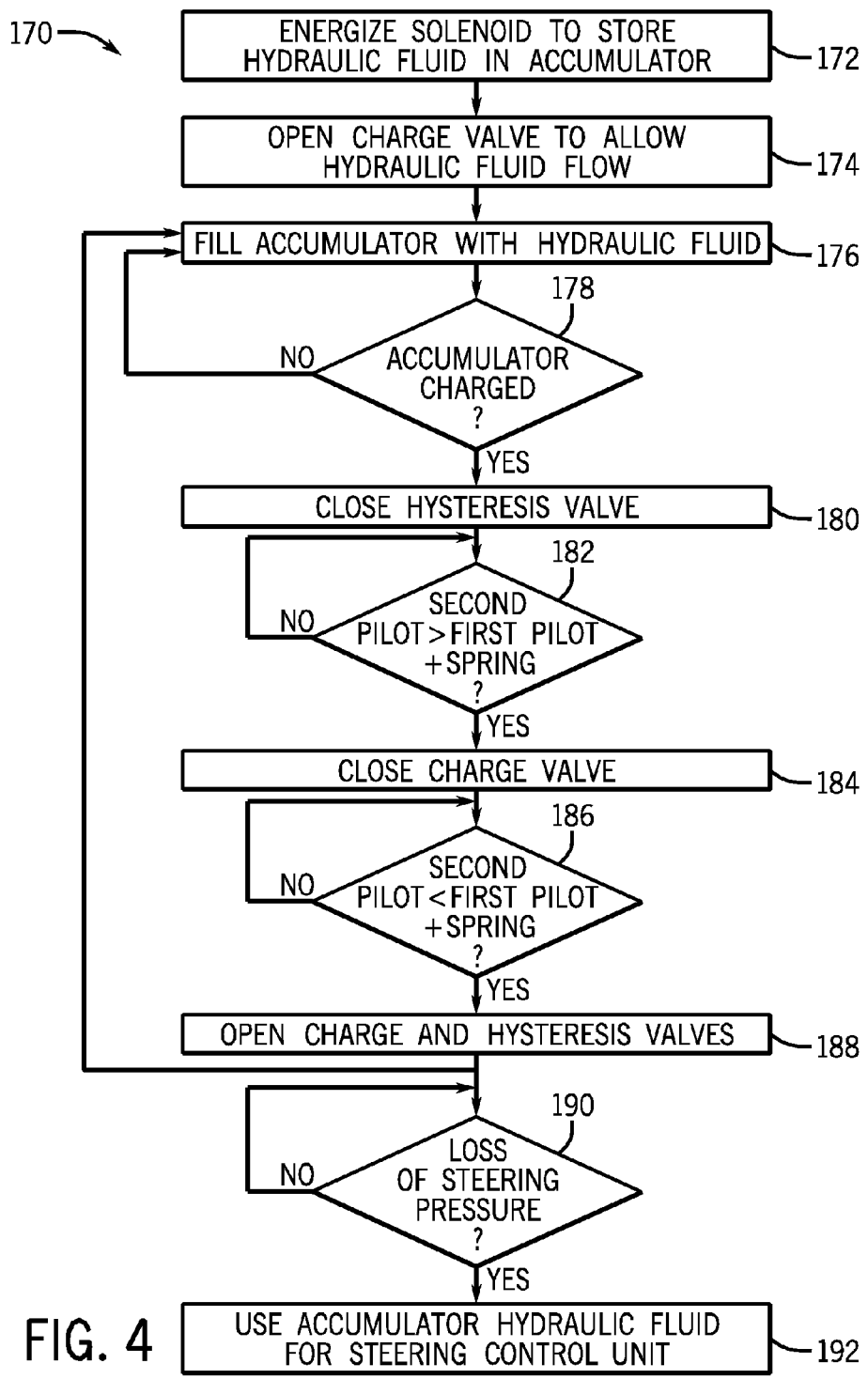
FIG. 4 is a flow chart of an embodiment of a method for charging an accumulator of a vehicle steering system.

FIG. 4 is a flow chart illustrating a method 170 for charging an accumulator 114 of a vehicle steering system. At step 172, the solenoid 124 is energized to close the discharge valve 116 so that the hydraulic fluid will be stored in the accumulator 114. Then, at step 174, the charge valve 56 is opened to allow hydraulic fluid to flow into the accumulator charging circuit 42 to charge the accumulator 114. Next, at step 176, the accumulator 114 is filled with the hydraulic fluid. At step 178, the accumulator charging circuit 42 determines whether the accumulator 114 is fully charged. If the accumulator 114 is not fully charged, the charging circuit 42 continues to charge the accumulator 114.

However, if the accumulator 114 is fully charged, at step 180, the hysteresis valve 76 is closed. After the hysteresis valve 76 is closed, the charging circuit 42 determines whether the pressure applied by the second pilot 66 is greater than the combined pressure applied by the spring 62 and the first pilot 64, per step 182. If the pressure applied by the second pilot 66 is not greater than the combined pressure applied by the spring 62 and the first pilot 64, the charging circuit 42 continues to monitor the pressures until such a condition occurs. If the pressure applied by the second pilot 66 is greater than the combined pressure applied by the spring 62 and the first pilot 64, at step 184, the charging circuit 42 closes the charging valve 56.

After the charging valve 56 is closed, the charging circuit 42 determines whether the pressure applied by the second pilot 66 is less than the combined pressure applied by the spring 62 and the first pilot 64, per step 186. If the pressure applied by the second pilot 66 is not less than the combined pressure applied by the spring 62 and the first pilot 64, the charging circuit 42 continues to monitor the pressures until such a condition occurs. If the pressure applied by the second pilot 66 is less than the combined pressure applied by the spring 62 and the first pilot 64, at step 188, the charging circuit 42 opens the hysteresis valve 76 and the charging valve 56.

The method 170 then repeats steps 176 through 188 during operation of the vehicle 10. While the charging circuit 42 continuously charges the accumulator 114, the steering system 34 also monitors the bypass circuit 44 for a loss of steering pressure, per step 190. If there is no loss of steering pressure, the charging circuit 42 continues to operate as already described. However, if there is a loss of steering pressure, at step 192, the steering system 34 opens the backup steering valve 128 to use the hydraulic fluid from the accumulator 114 for the steering control unit 46.

It may be appreciated that when the vehicle 10 is turned off, the solenoid 124 is no longer energized so the discharge valve 116 opens. Thus, the hydraulic fluid stored in the accumulator 114 during operation is drained into the reservoir 36. It should be noted that certain steps described above may be performed in a different order than described. Further, certain steps that are inherent in a steering system 34 occur, such as operating the pump 38 to pump hydraulic fluid through the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for charging an accumulator of a vehicle steering system, the vehicle steering system including a hydraulic pump, the accumulator, an accumulator charging circuit, a bypass circuit, and a steering control unit, the hydraulic pump supplying hydraulic fluid to the accumulator charging circuit and the bypass circuit, the method of charging an accumulator comprising:

opening a charging valve of the accumulator charging circuit to allow hydraulic fluid to flow from the hydraulic pump to the accumulator;

closing a hysteresis valve of the accumulator charging circuit when the hydraulic fluid in the accumulator reaches a first fluid pressure, wherein before the hysteresis valve is closed, hydraulic fluid flowing through the hysteresis valve applies a pressure via a first pilot of the charging valve;

closing the charging valve after the hysteresis valve is closed, wherein the charging valve is closed when a combined pressure applied by the first pilot and a spring drops below a pressure applied by a second pilot of the charging valve; and opening the charging valve to allow hydraulic fluid to flow from the hydraulic pump to the accumulator when the pressure applied by the second pilot of the charging valve decreases below the combined pressure applied by the first pilot and the spring, wherein the accumulator is charged only when the bypass circuit detects a loss of hydraulic fluid pressure.

2. The method of claim 1, comprising inhibiting hydraulic fluid flow from the accumulator to a hydraulic fluid reservoir when a solenoid of an accumulator drain valve is energized.

3. The method of claim 2, comprising allowing hydraulic fluid flow from the accumulator to the hydraulic fluid reservoir when the solenoid of the accumulator drain valve is de-energized.

4. The method of claim 1, comprising comparing a steering hydraulic fluid pressure to a backup steering valve spring pressure and inhibiting hydraulic fluid flow from the accumulator to the steering control unit when the steering hydraulic fluid pressure is greater than the backup steering valve spring pressure.

5. The method of claim 4, comprising allowing hydraulic fluid flow from the accumulator to the steering control unit when the steering hydraulic fluid pressure is less than the backup steering valve spring pressure.

6. The method of claim 1, comprising inhibiting hydraulic fluid flow from the accumulator to the charging valve using a check valve.

7. The method of claim 1, comprising limiting a hydraulic fluid flow rate from the charging valve to the accumulator when the charging valve is open.

* * * * *